Figure 1:
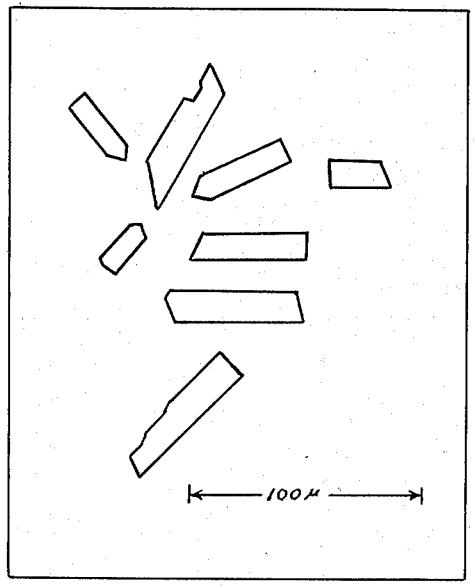

March 20, 1956

J. B. CONN ET AL 2,738,098

PROCAINE PENICILLIN

Filed March 31, 1950

INVENTORS
JOHN B. CONN
SARA L. NORMAN
BY
Edmund H. O'Brien
Howard E. Thompson Jr.
ATTORNEYS

2,739,098

PROCAINE PENICILLIN

John B. Conn, Westfield, and Sara L. Norman, New Brunswick, N. J., assignors to Merck & Co., Inc., Rahway, N. J., a corporation of New Jersey Application March 31, 1950, Serial No. 153,244

6 Claims. (Cl. 167—65)

This invention relates generally to new therapeutic preparations and, more particularly, to a new crystal form of procaine-benzylpenicillin adapted for use in parenteral suspensions, and to methods by which this new crystal form may be prepared.

Procaine-benzylpenicillin, a compound formed by reacting procaine with benzylpenicillin in equimolecular proportions, is valuable in the treatment of various diseases. Since procaine-benzylpenicillin is sparingly soluble in water and in other liquids suitable for parenteral administration, it has been proposed to administer this compound in the form of suspensions.

However, procaine-benzylpenicillin normally crystallizes in the form of needles and it has been observed that the administration of suspensions of needle-shaped crystals of procaine-benzylpenicillin is hazardous and causes serious difficulty.

In a syringe filled with a suspension of needle-shaped crystals of procaine-benzylpenicillin, obstruction is usually observed when pressure is applied to the syringe piston. Thus, the administration of such a suspension is always troublesome and adds materially to the discomfort of the patient.

We have now discovered that it is possible to prepare a new crystal form of procaine-benzylpenicillin and in this form procaine-benzylpenicillin is particularly suitable for the parenteral administration of suspensions of this compound.

The new crystals of procaine-benzylpenicillin prepared in accordance with our invention possess a polyhedral or platelet form which is particularly adapted for passage through a syringe needle. Thus, a suspension of crystalline procaine-benzylpenicillin having the shape of a platelet passes without difficulty through the narrow opening of the syringe needle.

We have found that the crystal growth habit of procaine-benzylpenicillin is completely altered when the reaction of procaine with benzylpenicillin is carried out in the presence of a water soluble cellulose ether such as methyl cellulose.

While a very small amount of methyl cellulose is required for the preparation of the new crystal form of procaine-benzylpenicillin, it is always advantageous to employ methyl cellulose in a concentration greater than 0.05%.

When lower concentrations of methyl cellulose are employed such as, for example, 0.02% or less, a mixture of crystals is obtained containing both the needle form and the blunt polyhedral form. When concentrations higher than 0.05% are utilized, the resulting procaine-benzylpenicillin is always recovered in platelet form which is particularly desirable for use in parenteral suspensions. The intermediate blunt polyhedral form, usually obtained when methyl cellulose is employed in a concentration of about 0.05% or less, is less satisfactory for use in parenteral suspensions than the platelet form.

The new platelet form of crystals of procaine-benzylpenicillin is entirely different in structure from the needle-shaped crystals. The length of the platelets is of the same order as their width, whereas the length of the needle is approximately 3 to 6 times as great as the width.

Figure 2:
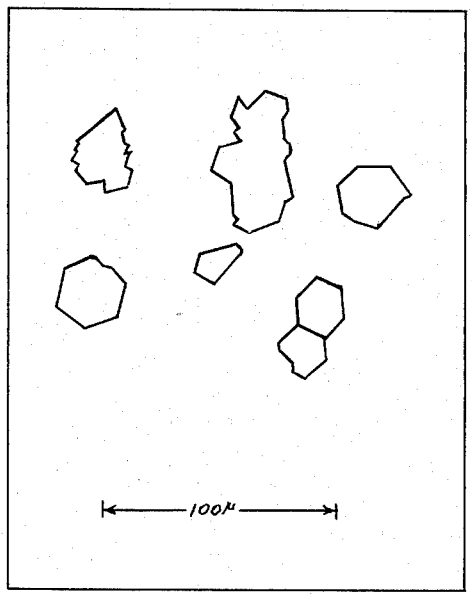

A comparison of the old and new crystal forms of procaine-benzylpenicillin is illustrated in the accompanying drawing in which Figure 1 represents the needle form and Figure 2 shows the new platelet form.

In preparing the new crystal form of procaine-benzylpenicillin in a preferred manner, a salt of benzylpenicillin is reacted with a salt of procaine. The salts of procaine which are particularly suitable for this reaction are the water soluble salts such as, for example, procaine hydrochloride. Among the salts of benzylpenicillin which may be used for this reaction are, for example, sodium benzylpenicillin, N-ethyl-piperidine-benzylpenicillin and other similar salts. It is usually preferable to employ equimolecular proportions of procaine and benzylpenicillin. The reaction is preferably carried out by first dissolving a salt of benzylpenicillin in an aqueous solution of methyl cellulose. A solution of a procaine salt in aqueous methyl cellulose is then added to the solution of the benzylpenicillinate and the reaction mixture is stirred at room temperature. The resulting solution is permitted to stand at room temperature and after a short period of time procaine-benzylpenicillin crystallizes in the form of minute flat platelets. The crystals may be recovered, and purified by washing in accordance with conventional procedures.

The following examples illustrate methods of carrying out the pesent invention, but it is to be understood that these examples are given by way of illustration and not of limitation.

EXAMPLE 1

To a solution of 27.3 g. (0.1 mole) of procaine hydrochloride in 500 ml. of 1% aqueous methyl cellulose was added a solution of 35.6 g. (0.1 mole) sodium-benzylpenicillinate in 500 ml. 1% aqueous methyl cellulose with continuous stirring at room temperature. After an induction period of a few minutes procaine benzylpenicillinate crystallized in the form of minute flat platelets which were recovered by filtration, washing and drying.

The crystals were mixed with buffered penicillin G sodium and tested for injectability in rabbits. In 29 trials there was no blocking observed.

In a comparable control experiment using a formulation containing the needle form there was blocking in 16 out of 62 trials.

EXAMPLE 2

To a solution of 22.3 g. (0.05 mole) N-ethyl piperidine benzylpenicillinate in 250 ml. of 0.1% aqueous methyl cellulose was added with stirring a solution of 13.8 g. (0.05 mole) procaine hydrochloride in 250 ml. of 0.1% aqueous methyl cellulose. The platelet form of procaine-penicillin, recovered as in Example 1, weighed 22.0 g.

EXAMPLE 3

To a solution of 273 mg. (0.001 mole) procaine hydrochloride in 5 ml. of 0.05% aqueous methyl cellulose was added a solution of 356 mg. (0.001 mole) sodium-benzylpenicillinate in 5 ml. of 0.05% aqueous methyl cellulose. The resulting crystals of procaine-benzylpenicillinate were found microscopically to consist of a mixture of platelets and blunt polyhedral forms.

EXAMPLE 4

Proceeding as in Example 3, but using methyl cellulose at 0.01 to 0.02% concentration, the procaine-benzylpenicillinate crystals were found to consist of a mixture of blunt polyhedral forms and needles.

EXAMPLE 5

A formulation was prepared using 2 g. procaine-penicillin G platelets, 425 mg. penicillin G potassium salt, 133 mg. anhydrous sodium citrate, and 32 mg. anhydrous sodium-carboxy methyl cellulose. This was prepared for a 5 dose vial, to which was added 4.5 cc. water and the whole shaken, resulting 6.4 cc. of an aqueous suspension. The suspension contained 300,000 units of procaine penicillin G and 100,000 units potassium penicillin G per cc.

The formulation was prepared under sterile conditions using sterile solids and was mixed by blending in a stainless steel tumbler.

The formulation has given favorable results with no blocking when used in animals.

The different crystal forms were compared by physical measurements. Dimensional measurements of two average preparations of the needle form and the new platelet form are as follows:

Needles

| Range (μ) | Avg. width | Percent of Total Number | [1] FDA Relative Weight Percent |
|---|---|---|---|
| 5–14 | 3.92 | 52.2 | 14.4 |
| 15–29 | 5.62 | 34.2 | 31.3 |
| 30–49 | 7.09 | 10.2 | 21.2 |
| 50–69 | 13.5 | 2.1 | 12.6 |
| 70–99 | 15.0 | 0.4 | 3.7 |
| 100–149 | 20.0 | 0.9 | 16.6 |

Platelets

| Range (μ) | Avg. width | Percent Total Number | [1] FDA Relative Weight Percent |
|---|---|---|---|
| 5–14 | 5–14 | 66.0 | 6.8 |
| 15–29 | 15–29 | 13.9 | 7.6 |
| 30–49 | 30–49 | 10.1 | 17.8 |
| 50–69 | 50–69 | 5.3 | 21.2 |
| 70–99 | 70–99 | 3.8 | 30.7 |
| 100–149 | 100–149 | 0.9 | 15.8 |

[1] FDA: Federal Drug Administration procedure described in "Tests and Methods of Assay and Certification of Antibiotics" vol. I, section 141.7 (D): Measures of Penicillin Particles.

Various changes and modifications in the foregoing procedure will occur to those versed in the art, and to the extent that such changes and modifications fall within the purview of the appended claims it will be understood that they constitute part of our invention.

We claim:

1. The process of preparing procaine-benzylpenicillin crystals in platlet form, which comprises reacting a water soluble benzylpenicillin salt with a water soluble salt of procaine in an aqueous solution containing a small amount of methyl cellulose.

2. The process of preparing procaine-benzylpenicillin crystals in platlet form, which comprises reacting a water soluble benzylpenicillin salt with a water soluble salt of procaine in an aqueous solution containing at least 0.05% methyl cellulose.

3. Crystalline procaine-benzylpenicillin in the form of platelets having a length to width ratio of about 1.

4. The process for preparing procaine penicillin crystals in modified form which comprises reacting procaine hydrochloride with a water soluble salt of penicillin in an aqueous solution containing a small amount of methyl cellulose.

5. In the process of preparing procaine-benzylpenicillin crystals in platlet form, the step which comprises crystallizing procaine-benzylpenicillin from an aqueous solution containing a small amount of methyl cellulose.

6. A pharmaceutical composition suitable for parenteral administration comprising an aqueous suspension of crystalline procaine benzyl penicillin in the form of platelets having a length to width ratio of about one.

References Cited in the file of this patent

UNITED STATES PATENTS

| | | |
|---|---|---|
| 2,177,269 | Sullivan | Oct. 24, 1940 |
| 2,236,545 | Maxwell | Apr. 1, 1941 |
| 2,445,478 | Foster et al. | July 20, 1948 |
| 2,446,974 | Chow | Aug. 10, 1948 |
| 2,515,898 | Rhodehamel | July 18, 1950 |

OTHER REFERENCES

Chem. Obst., vol. 25 (1931), p. 632.

Sullivan et al.: "Science," vol. 107, Feb. 13, 1948, pp. 168–170.

Salivar et al.: "J. Am. Chem. Soc." vol. 70 (1948), pp. 1287–88.

Boger et al.: "Am. J. Med. Sci.," vol. 25, March 1948, pp. 250–56.

Armstrong et al.: "Proc. Soc. Exp. Biol. and Med.," January 1945, pp. 74–76.

"Proc. Staff Meet. Mayo Clinic" (Feb. 7, 1945), pp. 40–42.

"Proc. Staff Meet. Mayo Clinic" (Dec. 10, 1947), pp. 567–70.